United States Patent
Kaneko

(10) Patent No.: US 11,630,879 B2
(45) Date of Patent: Apr. 18, 2023

(54) SERVER AND PROVIDING METHOD

(71) Applicant: CANON KABUSHIKI KAISHA, Tokyo (JP)

(72) Inventor: Shuhei Kaneko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 16/986,333

(22) Filed: Aug. 6, 2020

(65) Prior Publication Data
US 2021/0056232 A1    Feb. 25, 2021

(30) Foreign Application Priority Data
Aug. 21, 2019  (JP) .............................. JP2019-151202

(51) Int. Cl.
| | | |
|---|---|---|
| *G06F 16/958* | (2019.01) | |
| *G06F 21/62* | (2013.01) | |
| *G06F 40/166* | (2020.01) | |
| *G06F 40/14* | (2020.01) | |

(52) U.S. Cl.
CPC ........ *G06F 16/986* (2019.01); *G06F 21/6263* (2013.01); *G06F 40/14* (2020.01); *G06F 40/166* (2020.01)

(58) Field of Classification Search
CPC .... G06F 16/986; G06F 21/6263; G06F 40/14; G06F 40/166; G06F 40/143
See application file for complete search history.

(56) References Cited

U.S. PATENT DOCUMENTS

| | | | | |
|---|---|---|---|---|
| 8,341,529 | B1 * | 12/2012 | Li ........................... | G06F 16/95 715/741 |
| 2013/0298257 | A1 * | 11/2013 | Lee ......................... | G06F 21/10 726/27 |
| 2015/0161277 | A1 * | 6/2015 | Heller ................. | G06F 9/44526 715/229 |
| 2017/0154017 | A1 * | 6/2017 | Kristiansson ......... | G06F 9/4843 |
| 2018/0322199 | A1 * | 11/2018 | Fernandes ............ | G06Q 10/105 |

FOREIGN PATENT DOCUMENTS

JP            2002215574 A        8/2002

* cited by examiner

*Primary Examiner* — Asher D Kells
(74) *Attorney, Agent, or Firm* — Rossi, Kimms & McDowell LLP

(57) ABSTRACT

In order to prevent leakage of information, a server supplies a program to be executed by an external client having a Web browser that displays a screen based on Web data to the external client. Based on no operation for a predetermined time in regard to the screen displayed on the Web browser, the program causes the Web browser of the external client to perform a process of deleting an element related to specific content from the Web data corresponding to the screen displayed on the Web browser via a DOM (document object model), and updating the screen displayed on the Web browser with a screen not including the specific content.

7 Claims, 10 Drawing Sheets

FIG. 4

```
{
  "dataList" : [],
  "end" : false
}
```
~400

```
{
  "dataList" : [
    "https://storage.com/form/overlay111/svg/data-1.svg"
  ],
  "end" : false
}
```
~410

```
{
  "dataList" : [
    "https://storage.com/form/overlay111/svg/data-1.svg",
    "https://storage.com/form/overlay111/svg/data-2.svg"
  ],
  "end" : false
}
```
~420

```
{
  "dataList" : [
    "https://storage.com/form/overlay111/svg/data-1.svg",
    "https://storage.com/form/overlay111/svg/data-2.svg",
    "https://storage.com/form/overlay111/svg/data-3.svg"
  ],
  "end" : true
}
```
~430

FIG. 6

```
CUSTOMER INFORMATION SYSTEM: MR. CHOUHYOU TAROU          ~600

PERSON'S NAME    | CHOUHYOU TAROU           |~601
  ADDRESS          | 1-2-3 XXX CITY, XXX PREFECTURE |
  CONTACT NUMBER   | 090-0000-0000            |
  DATE OF BIRTH    | JANUARY 1, 1991          |
  SELECT FORM      | PLAN DESIGN SPECIFICATION A  V |~602
                   | PLAN DESIGN SPECIFICATION B    |
                   | WRITTEN ESTIMATION             |   603
                   | ...                            | [PREVIEW]
```

FIG. 7A

```
function addPage(page, scg_url){
 //DOWNLOAD SVG
 var xhr = new XMLHttp Request();
 xhr.responseType = 'arraybuffer';
 xhr.open('GET', svg_url, true);
 xhr.setRequestHeader('xxxxxxx',xxxxxx);
 xhr.send();

//CONVERT DOWNLOADED DATA INTO URL
 const blob = new Blob([xhr.response],) {type: 'image/svg+xml'});
 var url=URL.creat eObject URL(blob);

//LOAD SVG
 $("#page1").attr({data:url});
}
```

FIG. 7B

```
window.close();
```

FIG. 7C

```
function removePage(page){
 var dom_object = document.getElementById(page);
 var dom_object_parent = dom_object.parent Node;
 dom_object_parent.removeChild(dom_object);
}
```

FIG. 8A

```
<html lang="en">
  <head>
    <meta charset="utf-8">
        :
    <title>Web FORM BROWSING SCREEN</title>
    <link rel="stylesheet" href="/xxx/css/style.css">
  </head>
  <body>
    <div id="main"></div>
    <script src="/xxx/js/app.js"></script>
  </body>
</html>
```

```
<html lang="en">
  <head>
    <meta charset="utf-8">
        :
    <title>Web FORM BROWSING SCREEN</title>
    <link rel="stylesheet" href="/xxx/css/style.css">
  </head>
  <body>
    <div id="main">
        :
      <dev id="pages" >
        <div class="page prev">
          <object data="blob:[svg url]">
            <svg> ... </svg>
          </object>
        </div>
        <div class="page current">
          <object data="blob:[svg url]">
            <svg> ... </svg>
          </object>
        </div>
        <div class="page next">
          <object data="blob:[svg url]">
            <svg> ... </svg>
          </object>
        </div>
      </div>
    </div>
    <script src="/xxx/js/app.js"></script>
  </body>
</html>
```

```
<html lang="en">
<head>
<meta charset="utf-8">
  . .
<title>Web FORM BROWSING SCREEN</title>
<link rel="stylesheet" href="/xxx/css/style.css">          — 802
</head>
<body>
<div id="main">
  <dev class="Warning" >
    <img src="../img/warning.svg">
    <p class="message">PREVIEW HAS ENDED BECAUSE THERE HAS BEEN NO OPERATION FOR PREDETERMINED TIME</a>
  </dev>
</div>
<script src="/xxx/js/app.js"></script>        — 803
</body>
</html>
```

801

802

805

803

SERVER AND PROVIDING METHOD

BACKGROUND OF THE INVENTION

Field of the Invention

The present invention relates to a server and a providing method.

Description of the Related Art

In recent years, an increasing number of companies are replacing paper medium information with document data for the purpose of improving work efficiency and resource saving by making paperless. For example, business forms managed in-house are also a target to be replaced. In particular, a large number of pages are often output as forms to be output in a core system of a company, a public office or the like, and thus management costs are enormous, so that the forms are made digitized.

Also, use of cloud services is beginning to spread as a method of managing business data or performing various processes. More specifically, a user accesses a Web page of a cloud service from a Web browser of a client terminal via the Internet, and browses digitized form document data on the Web page. In this connection, it is expected that the number of use cases for editing and printing the form document data being browsed according to a business flow will increase.

In case of handling the form document data on the Web page, an SVG (scalable vector graphics) format that has a high affinity with the Web may be used. By using the SVG format, image quality deterioration due to screen enlargement/reduction does not occur. Thus, it is possible to perform drawing using dynamic expressions that are difficult to achieve with conventional form document data, so that it is possible to realize a Web form with high added value.

Besides, depending on a type of form document, there is a case where a form document with a high security level is displayed. More specifically, a form document created by insurance business often contains customer's personal information, and care must be taken when handling the relevant form document. Japanese Patent Application Laid-Open No. 2002-215574 discloses a technique of browsing a document with an expiration date.

SUMMARY OF THE INVENTION

According to the present invention, there is provided a server that supplies a program to be executed by an external client having a Web browser of displaying a screen based on Web data, to the external client: the server being characterized by supplying the program to the external client according to a request from the Web browser of the external client; and characterized in that based on no operation for a predetermined time in regard to the screen displayed on the Web browser, the program causes the Web browser of the external client to perform a process of deleting an element related to specific content from the Web data corresponding to the screen displayed on the Web browser via a DOM (document object model), and updating the screen displayed on the Web browser with a screen not including the specific content.

Further features of the present invention will become apparent from the following description of exemplary embodiments with reference to the attached drawings.

BRIEF DESCRIPTION OF THE DRAWINGS

FIG. 2 is a diagram for describing an example of each hardware constitution of a server and the like.

FIG. 3 is a diagram for describing an example of software configurations of the server and the like.

FIG. 4 is a diagram for describing conversion index files sequentially updated.

FIG. 6 is a diagram for describing an example of a business screen.

FIGS. 7A, 7B and 7C are diagrams for describing examples of JavaScript™.

FIGS. 8A, 8B and 8C are diagrams for describing examples of HTML (HyperText Markup Language).

DESCRIPTION OF THE EMBODIMENTS

Hereinafter, preferred embodiments of the present invention will be described in detail with reference to the attached drawings.

It is effective from a viewpoint of security to limit display of a form document with a high security level by setting an expiration date. On the other hand, for example, there is a case where a client terminal is left alone while a Web page of an owner of the client terminal, a form document or the like is being displayed. In the embodiments, there is provided a mechanism for reducing a risk that specific content is browsed by a third party because of being left unattended or the like. In a first embodiment, there will be concretely described a mechanism of dynamically deleting a display object of specific content and dynamically updating a screen to be displayed on a Web browser, on condition that no user operation is performed in regard to the Web browser of a client terminal.

First Embodiment

In the first embodiment, there will be concretely described a mechanism of dynamically deleting a display object of specific content and dynamically updating a screen to be displayed on a Web browser, on condition that no user operation is performed in regard to the Web browser of a client terminal.

(System Configuration)

Figure 1:
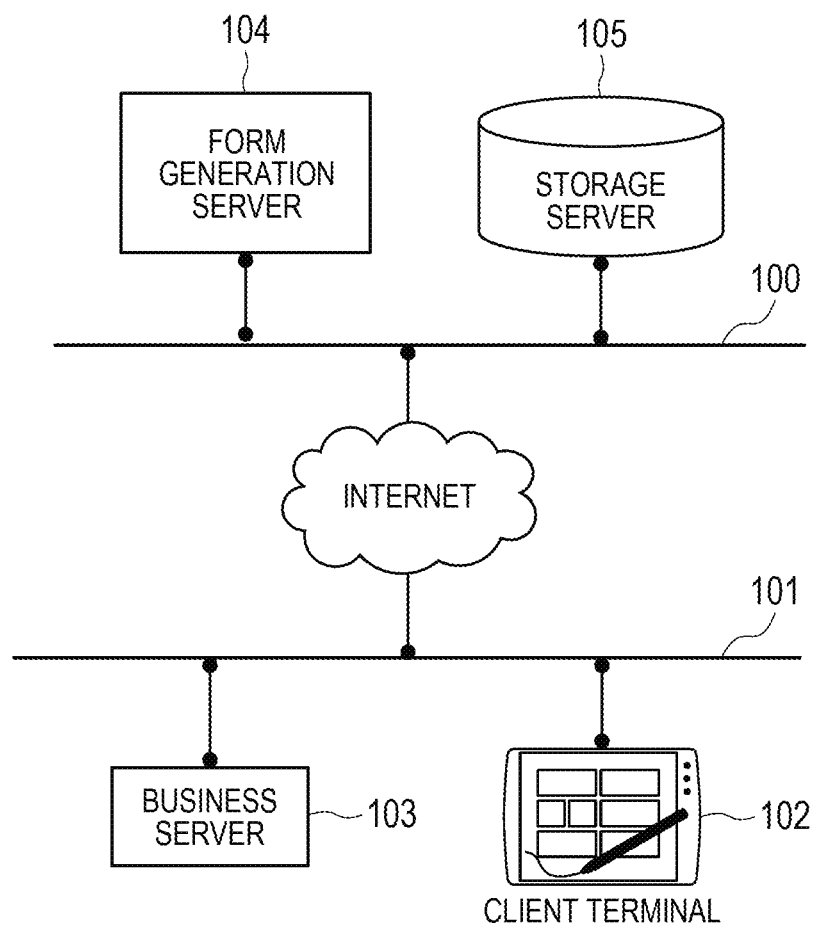
FIG. 1 is a diagram for describing an example of a system configuration of an information processing system.

FIG. 1 is a diagram for describing an example of a system configuration of an information processing system. In FIG. 1, a client terminal 102 is connected to a local network 101 via a wired or wireless LAN (local area network), and accesses the Internet 100 via the local network 101, thereby accessing servers 103 to 105. The client terminal 102 includes, for example, a desktop personal computer, a notebook computer, a smartphone, a tablet PC (personal computer), or the like. The client terminal 102 has a built-in environment for executing an application such as a Web browser 321 (FIG. 3) or the like. The Web browser 321 has an HTML rendering engine, and thus can display a Web page represented by an HTML or a CSS (Cascading Style Sheets). Besides, the Web browser has a JavaScript™ engine, and thus can rewrite a Web page without exchange with the Web server by interpreting and executing the JavaScript™. Incidentally, the JavaScript™ engine is an example of a script engine, and the JavaScript™ is an example of a script interpreted by a client side's script engine.

Figure 9:
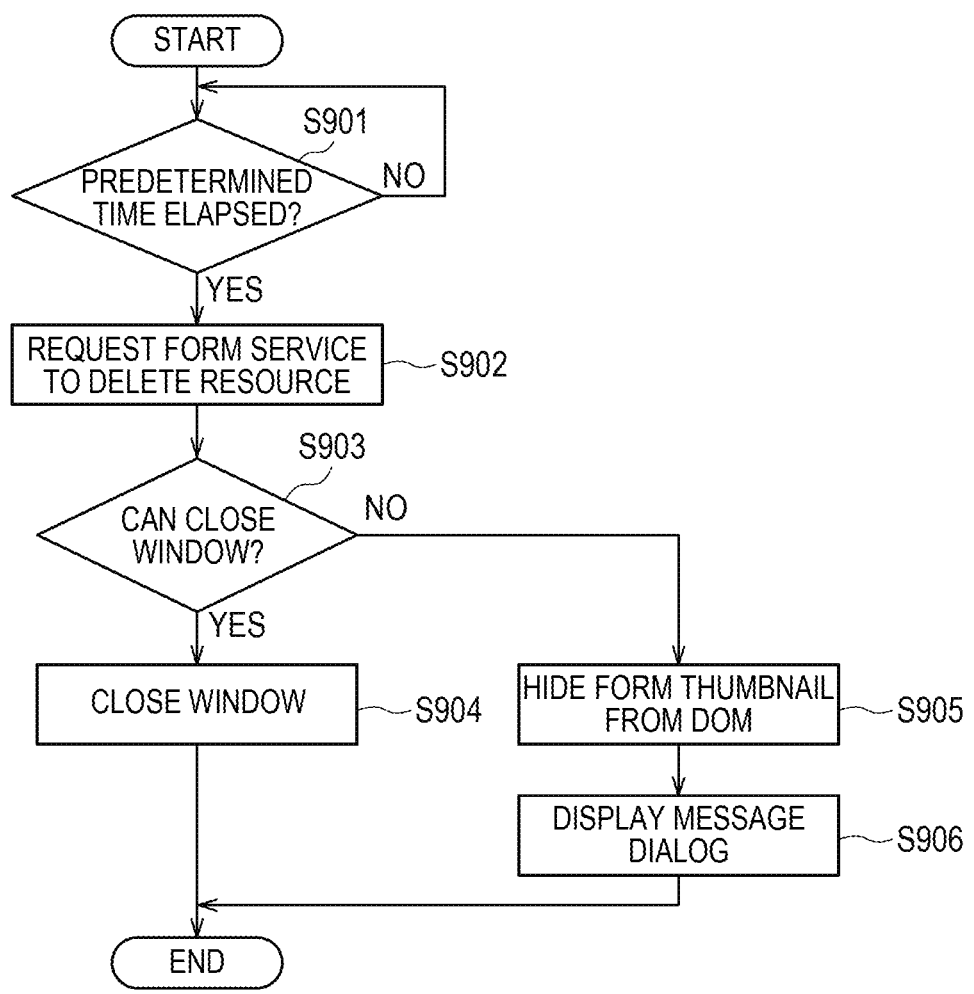
FIG. 9 is a flowchart for describing an example of a Web form document hiding process.

Each process in a later-described flowchart illustrated in FIG. 9 is realized by executing JavaScript™. A form is displayed by a Web form browsing program received from the form generation server 104 using the Web browser 321. The Web form browsing program obtains a Web form document from the storage server 105, and displays the obtained Web form document on the Web browser 321. Here, the Web form browsing program is a Web application that operates on the Web browser 321 capable of being distributed via a network. The Web form browsing program includes the HTML that represents the Web page, the CSS that is a style sheet, and a programming language (JavaScript™) that operates on the Web browser 321. Besides, the Web form browsing program is a program that demonstrates its function by being executed by the Web browser. The Web form browsing program downloads the Web form document (hereinafter also simply referred to as a form) from the storage server 105, and adds an element to be used for displaying the downloaded form to the previous HTML via a DOM (document object model). When the HTML is updated, the Web browser 321 updates the screen based on the updated HTML. By this process, the downloaded form can be displayed on the Web browser 321. The HTML included in the Web form browsing program is screen information for displaying the form on the Web browser 321. A screen that is displayed by the Web form browsing program by adding the element to be used for displaying the form to the HTML is called a Web form browsing screen. Incidentally, the Web form browsing program may be an application to be executed on, e.g., a computer system, other than the Web application operating on the Web browser 321. The Web form document is an example of Web data. The Web form browsing program is an example of a server at a transmission source of the Web form document.

The business server 103 is a server that manages user business information. In the present embodiment, a use case where the business server 103 manages business information and a salesperson performs sales to customers by using the information of the business server 103 is assumed. The business server 103 provides a screen for displaying the business information and giving a form data generation instruction in response to a request from the client terminal 102. Incidentally, the business server 103 may be constituted to be accessed from the client terminal 102 via the Internet.

The form generation server 104 receives the business information from the business server 103, and performs an overlay output process and a form browsing program generation process. That is, the form generation server 104 generates a Web form document by superimposing a field data file, which is text data, and a form information file including predetermined form information. Here, the Web form document is form document data in a format such as the SVG format handled on the Web page. Further, the form generation server 104 generates a form browsing program capable of browsing the generated Web form document. Incidentally, the generated Web form document is uploaded by the form generation server 104 to the storage server 105.

The storage server 105 is a server that manages files. The storage server 105 accepts a file download from the client terminal 102, and accepts a file upload and a file deletion request from the form generation server 104.

Incidentally, in the present embodiment, it is assumed that a user administrator previously stores the following information in each server. That is, the user administrator stores business information data in the business server 103, and stores a form template file corresponding to customer data in the form generation server 104.

Incidentally, the servers 103 to 105 may be one server.

(Hardware Constitution)

Figure 2:
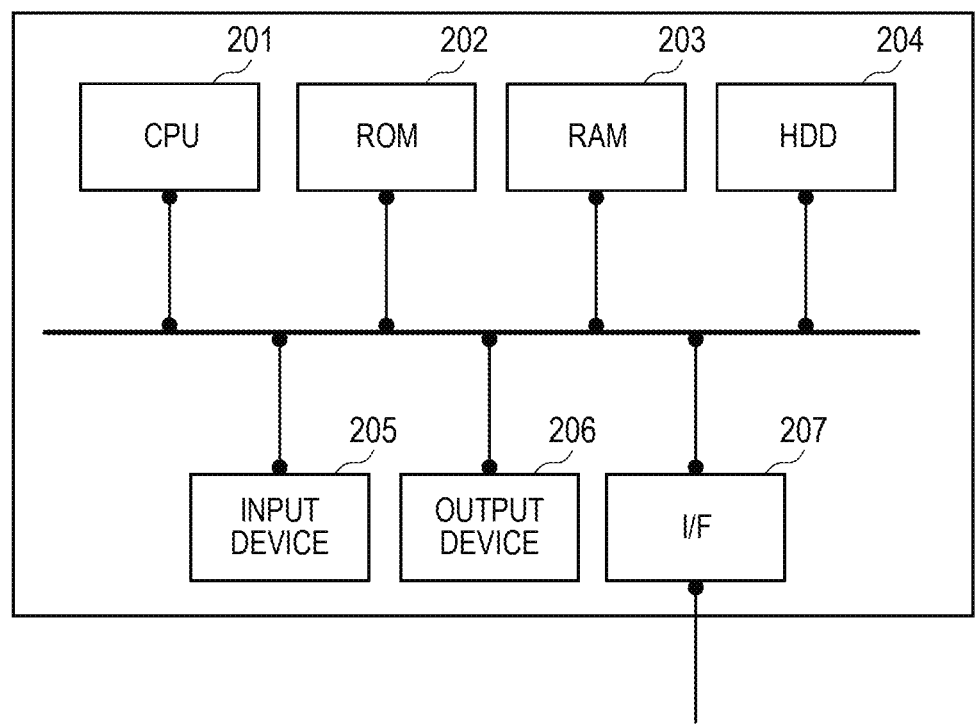

FIG. 2 is a diagram for describing an example of a hardware constitution of each of the client terminal 102, the business server 103, the form generation server 104, and the storage server 105.

In FIG. 2, a CPU (central processing unit) 201 directly or indirectly controls each of devices mutually connected by an internal bus, and executes programs. In a ROM (read only memory) 202, a BIOS (Basic Input/Output System) has been stored. A RAM (random access memory) 203 is used as a work area of the CPU 201, or used as a temporary storage for loading a software module. In an HDD (hard disk drive) 204, an OS (operating system) being basic software, and software modules are stored. As another example, an SSD (solid state drive) or the like may be used instead of the HDD. An input device 205 is a keyboard, a pointing device, a touch gesture detection device, or the like (not illustrated). A display is connected to an output device 206. Incidentally, the input device 205 and the output device 206 may be an integrated module such as a touch screen display. An I/F (interface) 207 is an interface for connecting to the local network 101.

In such hardware, after activation, the BIOS is executed by the CPU 201, and the OS is executably loaded from the HDD 204 to the RAM 203. According to the operation of the OS, the CPU 201 executably loads various software modules illustrated in later described FIG. 3 from the HDD 204 into the RAM 203 as needed. Various software modules are executed and operated by the CPU 201 in cooperation with each device. The I/F 207 is connected to the Internet 100 and the local network 101, and is controlled by the CPU 201 according to the operation of the OS, thereby realizing communication.

(Software Configuration)

Figure 3:
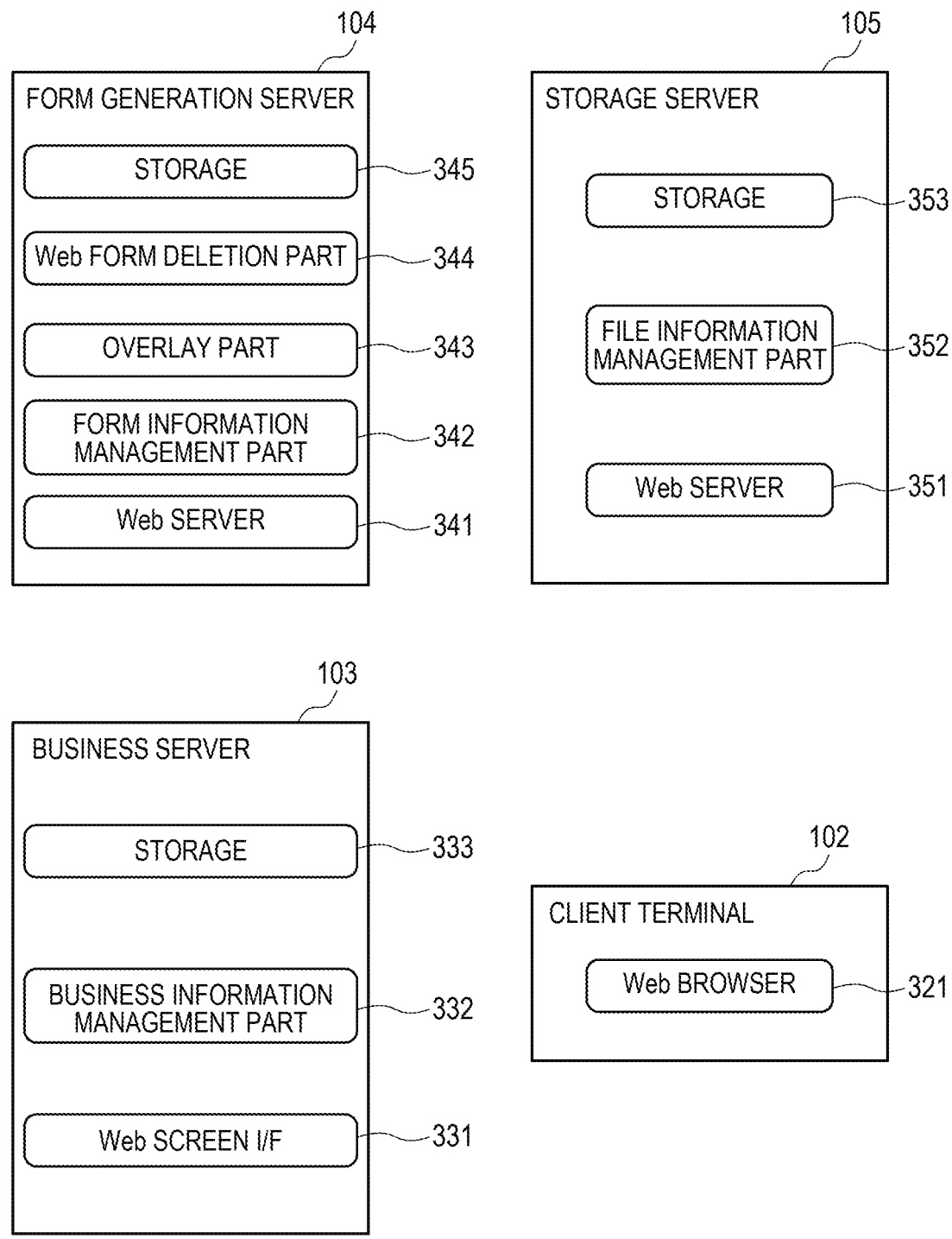

FIG. 3 is the diagram for describing an example of the software configurations of the client terminal 102, the business server 103, the form generation server 104, and the storage server 105. Hereinafter, the server software configurations and management information handled by each server will be described.

(Software Configuration and Management Information of Business Server 103)

The business server 103 includes a Web screen I/F 331, a business information management part 332, and a storage 333. Each software module is stored in the HDD 204 of FIG. 2, and is loaded into the RAM 203 and executed by the CPU 201 as described above.

The Web screen I/F 331 provides a user interface of the business server 103, and generates and returns a screen for displaying business information in response to a request from the Web browser 321 of the client terminal 102. The business information management part 332 stores and manages business information in the storage 333. These pieces of information may be stored not in an external memory of the business server 103 but in another server communicable via the Internet 100 and the local network 101.

Here, an example customer information to be managed by the business information management part 332 is shown in Table 1 (Customer Information).

TABLE 1

(Customer Information)

| Customer ID | Name | Address | Birth Date | Contact Number |
|---|---|---|---|---|
| 1 | CHOUHYOU TAROU | A-Prefecture B-City 1-2-3 | Jan. 1, 1989 | 090-9999-9999 |
| 2 | CHOUHYOU HANAKO | C-Prefecture D-City 2-3-4 | Feb. 2, 1990 | 080-1111-1111 |

The customer information is a data table to be used when generating a form. The data table holds information including a customer ID (identification), a name, an address, a birth date and a contact number that are used for uniquely discriminating a customer. The data necessary for generating the form is not limited to the customer information of the present embodiment, that is, various data such as product inventory, delivery information, deposit/withdrawal information and the like are assumed.

Here, an example of form information to be managed by the business information management part 332 is shown in Table 2 (Form Information).

TABLE 2

(Form Information)

| Form ID | Form Name | Form Template ID |
|---|---|---|
| form-001 | plan design specification A | template-001 |
| form-002 | plan design specification B | template-002 |
| form-003 | written estimate | template-003 |

The form information is a data table that holds form template information to be used when generating a form. The data table holds information including a form ID for uniquely discriminating the form information, a form name for screen display, and a form template ID for identifying a form information file managed by the form generation server 104.

The Web screen I/F 331 of the business server 103 accepts a form preview instruction from the Web browser 321 of the client terminal 102. The business information management part 332 transmits the corresponding customer information and the form template ID of the form information to the form generation server 104, and requests form generation.

(Software Configuration of Form Generation Server 104 and Management Information)

The form generation server 104 includes a Web server 341, a form information management part 342, an overlay part 343, a Web form deletion part 344, and a storage 345. Each software module is stored in the HDD 204 of FIG. 2, and is loaded into the RAM 203 and executed by the CPU 201 as described above.

The Web server 341 provides various interfaces of the form generation server 104, accepts requests from the Web browser 321 of the client terminal 102 and the business server 103, and returns responses thereto. The form information management part 342 stores and manages the form template information and form data information in the storage 345. The Web form deletion part 344 deletes the Web form document on the storage server 105 in response to a Web form deletion request from the Web form browsing program running on the Web browser 321 of the client terminal 102. Also, the Web form deletion part 344 deletes the form data information that associates an overlay ID with a conversion index file URL (Uniform Resource Locator), both described later.

Here, an example of the form template information to be managed by the form information management part 342 is shown in Table 3 (Form Template Information).

TABLE 3

(Form Template Information)

| Form Template ID | Form Template URL |
|---|---|
| template-001 | https://storage.com/templates/template-001 |
| template-002 | https://storage.com/templates/template-002 |
| template-003 | https://storage.com/templates/template-003 |

The form template information is a data table of the form information file managed by the form generation server 104. The information processing system holds the form information file as a file in the later-described storage server 105. The form template ID is an ID for uniquely discriminating the form information file, and the form template ID corresponds to the form template ID of the form information managed by the above-described business server 103.

When accepting the form generation request from the business server 103, the Web server 341 instructs the overlay part 343 to perform overlay output based on the customer information included in the request and the form template ID. The overlay part 343 accesses the form template URL of the corresponding form template information, obtains the form information file from the storage server 105, extracts the form information, and superimposes the extracted form information on the corresponding customer information, thereby generating a Web form document.

Here, an example of the form data information to be managed by the form information management part 342 and held in the storage 345 is shown in Table 4 (Form Data Information).

TABLE 4

(Form Data Information)

| Overlay ID | Conversion Index File URL |
|---|---|
| overlay-111 | https://storage.com/form/overlay-111/svg/index.json |
| overlay-222 | https://storage.com/form/overlay-222/svg/index.json |

The form data information is a data table related to the form document data to be managed by the form generation server 104. The overlay ID is an ID issued by the form information management part 342 when the form generation request is accepted from the business server 103, and is an ID capable of uniquely discriminating an overlay process. The conversion index file URL is a URL for the Web browser 321 to obtain a conversion index file from the storage server 105. The conversion index file will be described later.

(Software Configuration of Storage Server 105 and Management Information)

The storage server 105 includes a Web server 351, a file information management part 352, and a storage 353. Each software module is stored in the HDD 204 illustrated in FIG. 2, and is loaded into the RAM 203 and executed by the CPU 201 as described above.

The Web server 351 provides various interfaces of the storage server 105. The file information management part 352 manages file information, and inputs/outputs files according to a request accepted by the Web server 351. The storage 353 stores the file information and the file received by the storage server 105.

Here, an example of the file information to be managed by the file information management part 352 is shown in Table 5 (File information).

TABLE 5

(File Information)

| Data URL | File Path |
|---|---|
| https://storage.com/form/overlay-111/svg/index.json | /form/overlay-111/svg/index.json |
| https://storage.com/form/overlay-222/svg/index.json | /form/overlay-222/svg/index.json |

The file information is information on files stored in the storage server 105 managed by the file information management part 352. The data URL is a URL for uniquely discriminating the file stored in the storage server 105. The file path is a file path on the storage, and indicates a storage location of the file. The Web server 351 accepts a request for the data URL, and the file information management part 352 updates the corresponding file information and performs a file operation of the storage 353. For example, a client who requests a file operation to the storage server 105 can download the corresponding file by requesting an HTTP (HyperText Transfer Protocol) GET method to the data URL. Further, the client can upload and save the file by attaching the file to an HTTP PUT method and requesting to the data URL. Furthermore, the client can delete the corresponding file by requesting an HTTP DELETE method to the data URL.

(Conversion Index File)

Next, the conversion index files that are generated and sequentially updated at the time of the overlay by the form generation server 104 will be described.

In FIG. 4, conversion index files 400 to 430 that are generated and sequentially updated when the form generation server 104 performs the overlay output process are time-sequentially shown. The form generation server 104 first generates the conversion index file 400 in the storage server 105 at the time when the process is started. In the present embodiment, the conversion index file adopts a JSON (JavaScript Object Notation) file format, and is composed of a list of data URLs of process results with "dataList" as a key and a process completion flag with "end" as a key.

In the first embodiment, it is assumed that an overlay output result is an SVG file and the file output unit is every page. The form generation server 104 generates the conversion index file 400 being in an initial state at a start of each process. At this time, since the file has not been generated, the element of "dataList" is vacant and the value of "end" indicating the process result is false. After that, the form generation server 104 sequentially performs the process, uploads the file of the process result to the storage server 105, and adds the data URL to "dataList". The conversion index file 410 indicates a state in which the first file has been uploaded. The conversion index file 420 indicates a state in which the second file has been uploaded. Further, the form generation server 104 updates the index file to a state of the conversion index file 430 at a time when the file of the process result of the third file being the last page is uploaded. In the conversion index file 430, the data URL corresponding to the third file has been added to "dataList", and the process completion flag "end" has been updated to true.

The client terminal 102 can know the progress of the conversion process of the form generation server 104 by obtaining and referring the conversion index file from the storage server 105, and can sequentially download and display the Web form documents that have been converted.

Hereinafter, each process in the first embodiment will be described.

Figure 5:
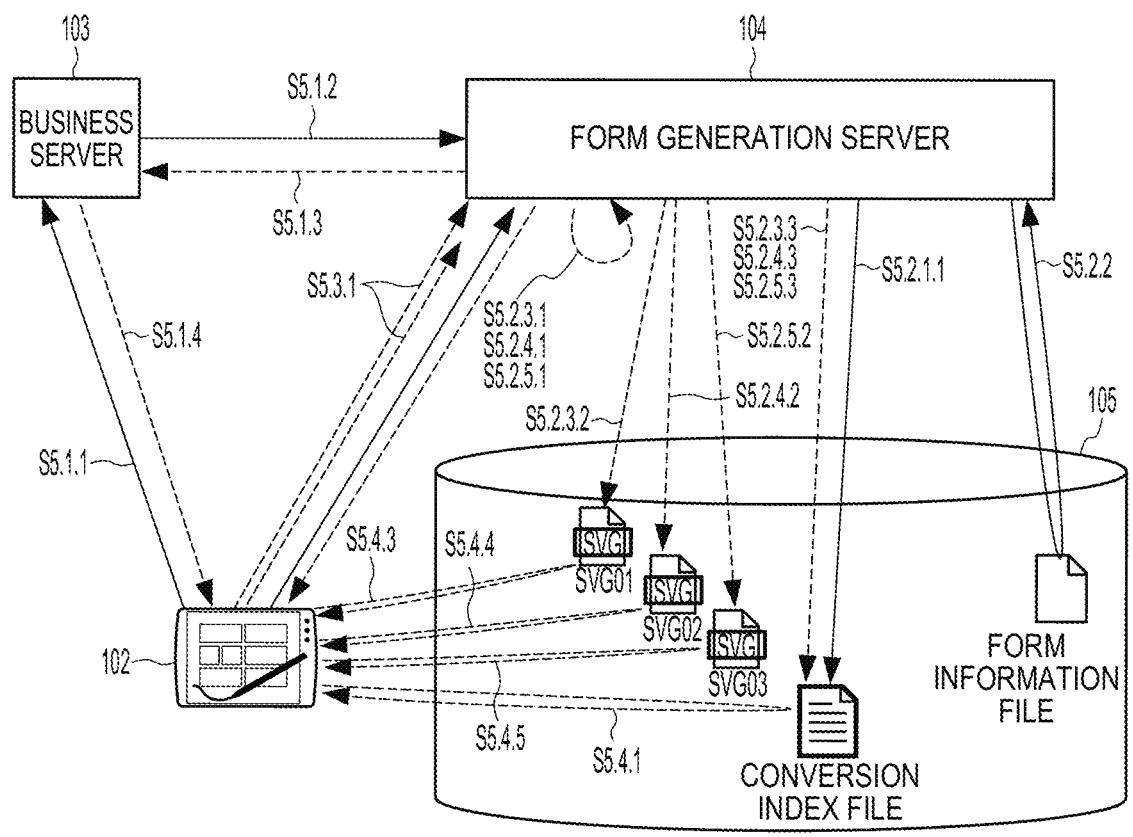
FIG. 5 is a diagram for describing an example of a process of preview display for a Web form browsing screen.

FIG. 5 is a diagram for describing a series of control for displaying a screen including a Web form. In response to a form preview request issued by the client terminal 102, the form generation server 104 generates the Web form document. The Web browser 321 of the client terminal 102 obtains and displays the Web form document. FIG. 6 is a diagram for describing an example of a business screen 600 in a case where the business server 103 is accessed from the Web browser 321 of the client terminal 102 and business data is displayed. The process illustrated in FIG. 5 is started at a time when a user performs a form preview request operation on the screen displayed on the Web browser 321.

When a form preview button 603 on the business screen 600 displayed in FIG. 6 is selected, the Web browser 321 transmits the form preview request to the business server 103 (S5.1.1). The form preview request includes the customer ID and the form ID selected as a form information 602.

The business screen will be explained with reference to FIG. 6. Customer information 601 and the form information 602 held by the business server 103 are displayed on the business screen 600. Here, the form information 602 is a form selection drop-down list from which one of the pieces of form information registered as the form information can be selected. Besides, the form preview button 603 is a form preview button for performing a form preview request operation.

Returning to the description of FIG. 5, in S5.1.2, the business information management part 332 of the business server 103 designates the customer ID, the customer information corresponding to the form ID, and the form template ID that are included in the form preview request transmitted in S5.1.1, and transmits the form generation request to the form generation server 104.

When the form generation server 104 receives the form generation request, the form information management part 342 issues and registers the overlay ID in the form data information. Further, in S5.1.3, the form generation server 104 returns the overlay ID as a response to the form generation request.

In S5.1.4, the business server 103 returns the overlay ID to the Web browser 321 of the client terminal 102.

Besides, the form information management part 342 of the form generation server 104 obtains the form template URL from the form template information based on the form template ID included in the form generation request, in parallel with the process of S5.1.3. Then, the form information management part 342 issues and transfers an overlay output instruction to the overlay part 343 together with the customer information.

When receiving the overlay output instruction, in S5.2.1.1, the overlay part 343 generates and uploads the conversion index file 400 to the storage server 105.

In S5.2.2, the overlay part 343 accesses the form template URL, obtains the form template file, superimposes the obtained form template file on the customer information, and then starts the overlay process.

In S5.2.3.1, the overlay part 343 outputs the Web form document (SVG01) as the overlay output result.

In S5.2.3.2, the overlay part 343 uploads the generated SVG file (SVG01) to the storage server 105.

Next, in S5.2.3.3, the overlay part 343 uploads the conversion index file 410 in which the data URL of the uploaded SVG file (SVG01) has been added to "dataList".

Subsequently, in S5.2.4.2, the overlay part 343 uploads an output result SVG (SVG02) of a next overlay process S5.2.4.1 to the storage server 105.

Further, in S5.2.4.3, the overlay part 343 uploads the conversion index file 420 in which the data URL of the uploaded SVG file (SVG02) has been added to "dataList".

In S5.2.5.1, a final overlay process in page units is performed.

In S5.2.5.1, the overlay part 343 outputs an SVG file (SVG03) as the overlay output result.

In S5.2.5.2, the overlay part 343 uploads the generated SVG file (SVG03) to the storage server 105.

Besides, the overlay part 343 adds the data URL of the uploaded SVG file (SVG03) to "dataList". Further, the overlay part 343 updates the process completion flag "end" to true, which is a value indicating completion. Then, in S5.2.5.3, the overlay part 343 uploads the obtained conversion index file 410 to the storage server 105.

In a case where there are many overlay output units, the process of S5.2.4.1 to S5.2.4.3 is repeated.

On the other hand, after receiving the overlay ID in S5.1.4, in S5.3.1, the Web browser 321 of the client terminal 102 designates the overlay ID and periodically obtains the form data information in regard to the form generation server 104. When the conversion index file URL is included in the response of S5.3.1, the Web browser 321 ends the process of S5.3.1. The Web browser 321 periodically accesses the conversion index file URL to start downloading the file. At this time, the content of the conversion index file obtained by the Web browser 321 comes to be one of the states of the above conversion index files 400 to 430 illustrated in FIG. 4, depending on the progress of the overlay process performed in parallel by the form generation server 104.

In S5.4.1, when the URL exists in "dataList" (410, 420, 430), the Web browser 321 downloads the Web form document (S5.4.3 to S5.4.5) from the data URL. Subsequently, an element for displaying the form is added to the HTML of the Web form browsing screen via the DOM. The Web browser 321 reads the HTML (conversion index file) 400 to which the element for displaying the form has been added via the DOM, and displays the Web form browsing screen.

FIG. 7A illustrates an example of the JavaScript™ for downloading the form and adding the downloaded form to the HTML via the DOM. When the Web browser 321 executes the JavaScript™, the process described in the relevant program is performed. In the case of FIG. 7A, the Web browser 321 downloads the form (data indicating content) of the SVG format, saves the downloaded form in a cache area (not illustrated) of the Web browser 321, converts the saved data into the URL, and adds the URL to the HTML. States of such changes are illustrated in FIGS. 8A to 8C. That is, FIG. 8A illustrates the HTML that is obtained when the Web form browsing program is downloaded. FIG. 8B illustrates the HTML (updated HTML) in which the element for displaying the form has been added to the HTML by executing the JavaScript™. Here, 801 indicates the HTML included in the Web form browsing program, 802 designates the path of the CSS file used by the HTML, and 803 designates the JavaScript™ to be executed. By executing this Javascript™ when reading the HTML, the form is DOM-added to the HTML. As a result, the path of the form is inserted as indicated by 804. This URL is the URL of the above-described form stored in the cache area.

The Web browser 321 ends the process of S5.4.1 at the time when the process completion flag "end" of the conversion index file comes to be true (430).

(Flowchart for Web Form Preview End)

FIG. 9 is the flowchart for describing an example of a Web form document hiding process for ending a preview of the Web form when the Web browser 321 of the client terminal 102 is not operated for a predetermined time. The Web form document hiding process is started in a case where the Web browser 321 obtains the Web form browsing program from the form generation server 104. The process illustrated in FIG. 9 is an example of a display control process.

In S901, the Web form browsing program periodically determines whether or not the predetermined time has elapsed from the last operation by the user. More specifically, the Web form browsing program retains information on the last operation date and time each time the user performs an operation, calculates a difference between the current time and the last operation date and time, and thus determines whether or not the predetermined time has elapsed. When it is determined that the predetermined time has elapsed, the Web form browsing program advances the process to S902. On the other hand, when it is determined that the predetermined time has not elapsed, the Web form browsing program returns the process to S901.

In S902, the Web form browsing program transmits the Web form deletion request to the form generation server 104. At this time, the Web form browsing program includes the overlay ID received in S5.1.4 in the Web form deletion request. When receiving the form deletion request, the form generation server 104 obtains the overlay ID included in the received request. The Web form deletion part 344 of the form generation server 104 obtains the conversion index file URL from the storage 345, and deletes the target Web form document. Also, the Web form deletion part 344 deletes the form data information that associates the overlay ID with the conversion index file URL.

In S903, the Web form browsing program determines whether or not a window can be closed. For example, the Web form browsing program may make determination using information on a history property of a Window object of the Web browser. When it is determined that the window can be closed, the Web form browsing program advances the process to S904. On the other hand, when it is determined that the window cannot be closed, the Web form browsing program advances the process to S905. Incidentally, it may be possible to adopt a configuration in which the window close is performed without determining the window close, and the processes of S905 and the subsequent steps are performed when the window is not closed.

In S904, the Web form browsing program the window close. FIG. 7B illustrates an example of the JavaScript™ for closing the window. When the window is closed, the Web form that has been left unattended for the predetermined time cannot be browsed. In S905, the Web form browsing program deletes the element via the DOM to hide the Web form. FIG. 7C illustrates an example of the JavaScript™ for deleting the element for displaying the form from the HTML via the DOM. In the present embodiment, the script illustrated in FIG. 7C is used to perform control such that each element for displaying the form added to the HTML is deleted from the HTML by the process described in FIG. 7A. In this way, by deleting the element necessary for displaying the form via the DOM, even if the window cannot be closed, it is possible to update the Web form left unattended for the predetermined time to the state incapable of being browsed.

In S906, the Web form browsing program displays a message dialog on the Web browser. FIG. 8C illustrates the HTML that has been changed by the processes of S905 and S906 having been performed. More specifically, the Web form is deleted from the browser in S905, and a message dialog 805 is added in S906.

According to the first embodiment, in case of displaying a document with a high security level on the Web browser 321 of the client terminal 102, the Web form browsing program hides the Web form when it is determined that there is no operation for the predetermined time. Thus, it possible to prevent leakage of information even if the client terminal, such as a tablet, is left with the Web form being displayed.

(Modification 1)

In the first embodiment, when there is no user operation on the client terminal 102 for the predetermined time, the Web form browsing program causes the form generation server 104 to delete the Web form document held in the storage server 105. Incidentally, it is possible to prevent re-obtainment of the resource of the Web form for which there is no operation for the predetermined time, by using an access token other than resource deletion.

Hereinafter, Modification 1 will be described. Incidentally, the description of portions common to the first embodiment will be omitted, and only different portions will be described hereinafter.

In FIG. 5, in the form generation server 104, when the form generation request is received, the form information management part 342 issues the overlay ID and registers the issued overlay ID in the form data information. Further, in S5.1.3, the form information management part 342 issues an access token, and returns the overlay ID and the access token as a response to the form generation request. Incidentally, the description of access token issuance, access token deletion, and a process to the access using the access token will be omitted.

In S5.1.4, the business server 103 returns the overlay ID and the access token to the Web browser 321 of the client terminal 102.

After receiving the overlay ID and the access token in S5.1.4, the Web browser 321 of the client terminal 102 periodically obtains the form data information from the form generation server 104 by using the overlay ID and the access token in S5.3.1.

In S902 of FIG. 9, the Web form browsing program transmits the Web form deletion request to the form generation server 104. At this time, the Web form browsing program includes, in the Web form deletion request, the overlay ID and access token received in S5.1.4. When receiving the form deletion request, the form generation server 104 obtains the overlay ID included in the received request. The Web form deletion part 344 of the form generation server 104 obtains the conversion index file URL from the storage 345, and deletes the target Web form document. Also, the Web form deletion part 344 deletes the form data information that associates the overlay ID with the conversion index file URL, and invalidates the access token.

According to Modification 1, the form generation server 104 issues the access token, and invalidates the relevant access token when receiving the form deletion request, so that re-obtainment of the resource of the Web form can be prevented.

Other Embodiments

The present invention can be achieved also by a process in which a program of achieving one or more functions of the above embodiments is provided to a system or an apparatus via a network or a storage medium and one or more processors in the computer of the system or the apparatus reads and executes the program. Besides, the present invention can also be achieved by a circuit (e.g., an ASIC) that achieves the one or more functions of the above embodiments.

As described above, according to the above-described embodiments, even in a case where an electronic document with a high security level is displayed on the Web browser such as the tablet and left unattended, it is possible to hide the electronic document on the Web browser when there is no operation for the predetermined time. Further, since it is possible to delete the resource on the server when there is no operation for the predetermined time, the electronic document cannot be re-obtained even if the Web page is reloaded. Therefore, it is possible to prevent leakage of information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-151202, filed Aug. 21, 2019, which is hereby incorporated by reference herein in its entirety.

What is claimed is:

1. A server that supplies a program to be executed by an external client having a Web browser of displaying a screen based on Web data, to the external client, comprising:
   at least one memory that stores a set of instructions; and
   at least one processor that executes the instructions, the instructions, when executed, causing the server to perform operations comprising:
   supplying the program to the external client according to a request from the Web browser of the external client, wherein the program causes the Web browser of the external client to perform a determination process of determining whether or not the screen displayed on the Web browser of the external client can be closed by the program, and in a case where a user operation is not performed for a predetermined time in regard to the screen displayed on the Web browser of the external client and where it is determined that the screen displayed on the Web browser of the external client can be closed by the program, the program causes the screen on the Web browser of the external client to be closed, and in a case where a user operation is not performed for the predetermined time in regard to the screen displayed on the Web browser of the external client and where it is determined that the screen displayed on the Web browser of the external client cannot be closed by the program, the program causes the Web browser of the external client to perform a process of deleting an element related to specific content from the Web data corresponding to the screen displayed on the Web browser of the external client via a DOM (document object model), and updating the screen displayed on the Web browser of the external client with a screen not including the specific content.

2. The server according to claim 1, wherein, based on no user operation in regard to the Web browser of the external client for the predetermined time, the program causes the Web browser of the external client to perform a process of requesting deletion of the Web data to the server.

3. The server according to claim 1, wherein
in a case where the process of updating the screen displayed on the Web browser of the external client with the screen not including the specific content is performed, the program causes the Web browser of the external client to perform a process of displaying, on the Web browser of the external client, information indicating that display of the specific content ends because of the no operation for the predetermined time.

4. The server according to claim 1, wherein
the program is a script, and
the script is executed via a script engine of the Web browser of the external client.

5. The server according to claim 1, wherein
the operations further comprise providing the Web data to the Web browser of the external client, and
a screen at least based on the Web data obtained from the server is displayed on the Web browser of the external client.

6. A providing method of providing Web content to a Web browser of an external client, comprising: providing Web data and a program to the Web browser of the external client, after a predetermined request is issued from the Web browser of the external client, wherein
a screen at least based on the provided Web data is displayed on the Web browser of the external client, and the program causes the Web browser of the external client to perform a determination process of determining whether or not the screen displayed on the Web browser of the external client can be closed by the program, and in a case where a user operation is not performed for a predetermined time in regard to the screen displayed on the Web browser of the external client and where it is determined that the screen displayed on the Web browser of the external client can be closed by the program, the program causes the screen on the Web browser of the external client to be closed, and in a case where a user operation is not performed for the predetermined time in regard to the screen displayed on the Web browser of the external client and where it is determined that the screen displayed on the Web browser of the external client cannot be closed by the program, the program causes the Web browser of the external client to perform a process of deleting an element related to specific content from the Web data corresponding to the screen displayed on the Web browser of the external client via a DOM (document object model), and updating the screen displayed on the Web browser of the external client with a screen not including the specific content.

7. A non-transitory computer-readable storage medium storing a computer program to execute a method for controlling a computer having a Web browser that obtains Web data from a server and displays a screen based on the Web data, wherein
the computer causes the Web browser of the external client to perform a determination process of determining whether or not the screen displayed on the Web browser of the external client can be closed by the program, and in a case where a user operation is not performed for a predetermined time in regard to the screen displayed on the Web browser of the external client and where it is determined that the screen displayed on the Web browser of the external client can be closed by the program, the computer causes the screen on the Web browser of the external client to be closed, and in a case where a user operation is not performed for the predetermined time in regard to the screen displayed on the Web browser of the external client and where it is determined that the screen displayed on the Web browser of the external client cannot be closed by the program, the computer updates the screen displayed on the Web browser of the external client with a screen not including specific content, by deleting an element related to the specific content from the Web data corresponding to the screen displayed on the Web browser of the external client via a DOM (document object model).

* * * * *